(12) United States Patent
Jang

(10) Patent No.: US 7,808,754 B2
(45) Date of Patent: Oct. 5, 2010

(54) HYBRID PROTECTION CIRCUIT FOR ELECTROSTATIC DISCHARGE AND ELECTRICAL OVER-STRESS

(75) Inventor: Joon-Tae Jang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 290 days.

(21) Appl. No.: 11/979,426

(22) Filed: Nov. 2, 2007

(65) Prior Publication Data
US 2008/0106837 A1 May 8, 2008

(30) Foreign Application Priority Data
Nov. 3, 2006 (KR) .................. 10-2006-0108050

(51) Int. Cl.
*H02H 9/00* (2006.01)
(52) U.S. Cl. .................. 361/56; 361/91.1; 361/111
(58) Field of Classification Search .................. 361/56, 361/91.1, 111
See application file for complete search history.

(56) References Cited

U.S. PATENT DOCUMENTS

| 5,825,603 A | 10/1998 | Parat et al. |
| 5,946,177 A * | 8/1999 | Miller et al. .................. 361/56 |
| 6,104,234 A * | 8/2000 | Shin et al. .................. 327/535 |
| 7,382,592 B2 * | 6/2008 | Chen et al. .................. 361/56 |
| 2004/0109271 A1 | 6/2004 | Takeda |
| 2004/0136126 A1 * | 7/2004 | Smith .................. 361/56 |

FOREIGN PATENT DOCUMENTS

WO  01/11750  2/2001

* cited by examiner

*Primary Examiner*—Jared J Fureman
*Assistant Examiner*—Christopher J Clark
(74) *Attorney, Agent, or Firm*—Harness, Dickey & Pierce, P.L.C.

(57) ABSTRACT

A hybrid protection circuit may include a stress detection circuit, a clamp device, and an on-time adjustment circuit. The stress detection circuit may output a detection signal that may be activated when a positive ESD event or a positive EOS event occurs. The on-time adjustment circuit may receive a detection signal and output a clamping signal that may be in an active state until charges generated by a positive ESD event or a positive EOS event are discharged. The clamp device may discharge charges induced by an ESD event or an EOS event. Therefore, a hybrid protection circuit may protect the internal core from both an ESD event and an EOS event.

20 Claims, 10 Drawing Sheets

HYBRID PROTECTION CIRCUIT FOR ELECTROSTATIC DISCHARGE AND ELECTRICAL OVER-STRESS

PRIORITY STATEMENT

This application claims priority under 35 USC §119 to Korean Patent Application No. 2006-108050, filed on Nov. 3, 2006 in the Korean Intellectual Property Office (KIPO), the entire contents of which are herein incorporated by reference.

BACKGROUND

1. Field

Example embodiments relate to a hybrid protection circuit for more efficiently protecting an internal core of a device from both an electrostatic discharge (ESD) event and an electrical over-stress (EOS) event.

2. Description of Related Art

Electrostatic discharge (ESD) is a phenomenon in which a finite quantity of electrostatic charge is rapidly transferred between bodies or surfaces at different electrostatic potentials. The duration of ESD events may range from picoseconds to microseconds. Electrical over-stress (EOS) is an electrical shock caused by a product being exposed to leakage current or voltage (usually from a power supply device or test equipment). The duration of EOS events may range from nanoseconds to milliseconds. As described above, ESD and EOS may have a difference in duration of electrical transient pulse widths.

If an ESD event or an EOS event occurs in a device manufactured by a CMOS process, a thin insulating layer, such as a gate oxide layer, may be damaged. Thus, a circuit for ESD and/or EOS protection may be required. Due to the advances of semiconductor technology, the degree of integration of semiconductor devices has increased and power consumption of semiconductor devices has decreased, and thus, semiconductor devices may be more easily exposed to ESD. When the thickness of a gate oxide layer of a MOS transistor ranges from about 3 nm to about 4 nm, the insulating layer may be damaged and/or destroyed by a voltage ranging from about 3 V to about 4 V. Therefore, a protection circuit protecting the internal core of a device from an ESD event and/or an EOS event may be necessary in this case.

FIG. 1 is a circuit diagram illustrating a conventional gate-grounded NMOS (GGNMOS) transistor. FIG. 2 is a circuit diagram illustrating a conventional gate-coupled NMOS (GCNMOS) transistor.

The GGNMOS transistor having a gate, a source, and a body that are all grounded uses a snap-back phenomenon. As such, the GGNMOS transistor may efficiently protect from an EOS event that has a relatively longer duration of electrical transient pulse widths. However, the GGNMOS transistor may be inefficient in protecting the internal core from an ESD event until the triggering voltage at which the ESD current is discharged through the transistor is reached.

A GCNMOS transistor having a configuration in which the silicide-blocking layer (SBL) has been removed may be employed. The configuration may be efficient to protect the internal core from an ESD event having a relatively shorter duration of electrical transient pulse widths. However, the configuration may be inefficient to protect from an EOS event having a relatively longer duration of electrical transient pulse widths.

SUMMARY

Example embodiments provide a hybrid protection circuit having adjustable on-time to more efficiently protect the internal core of a device from an ESD event and/or an EOS event.

According to example embodiments, a hybrid protection circuit may include a stress detection circuit, a clamp device, and an on-time adjustment circuit.

The stress detection circuit may be connected between a power supply voltage and a ground voltage and may be configured to output a detection signal that is activated when a positive ESD event or a positive EOS event occurs. The clamp device may be connected between the power supply voltage and the ground voltage, configured to discharge first charges generated by a negative ESD event or a negative EOS event when the negative ESD event or the negative EOS event occurs, and configured to discharge second charges generated by the positive ESD event or the positive EOS event in response to a clamping signal activated when the positive ESD event or the positive EOS event occurs. The on-time adjustment circuit may be connected between the power supply voltage and the ground voltage, configured to receive the detection signal, configured to output the clamping signal, and configured to maintain the clamping signal in an active state until the second charges generated by the positive ESD event or the positive EOS event are discharged.

The stress detection circuit may include a capacitor coupled between the power supply voltage and a first node, and a resistor coupled between the first node and the ground voltage. The capacitor may be implemented as a MOS capacitor having the gate coupled to the resistor and the source, the drain, and the body coupled to the power supply voltage. The resistor may be implemented as a plurality of serially-connected NMOS transistors each having the gate coupled to the power supply voltage and the body coupled to the ground voltage. The time period of the detection signal being in an active state may be determined by the capacitance of the capacitor and the resistance of the resistor.

The on-time adjustment circuit may include a first feedback circuit and a second feedback circuit each having a feedback architecture to adjust the on-time of the clamping signal.

The first feedback circuit may include a first inverter configured to invert the detection signal, a second inverter configured to invert a first output signal of the first inverter, and a first feedback transistor configured to bias a second output signal of the second inverter to the first inverter. The first inverter may include a first PMOS transistor having the source coupled to the drain of the first feedback transistor, the gate coupled to the first node, the body coupled to the power supply voltage, and the drain coupled to a second node. The first inverter may further include a first NMOS transistor having the source coupled to the ground voltage, the gate coupled to the first node, the body coupled to the ground voltage, and the drain coupled to the second node. The second inverter may include a second PMOS transistor having the source coupled to the power supply voltage, the gate coupled to the second node, the body coupled to the power supply voltage, and the drain coupled to a third node. The second inverter may further include a second NMOS transistor having the source coupled to the ground voltage, the gate coupled to the second node, the body coupled to the ground voltage, and the drain coupled to the third node. The first feedback transistor may be a PMOS transistor having the source coupled to the power supply voltage, the gate coupled to the third node, the body coupled to the power supply voltage, and the drain coupled to the source of the first PMOS transistor.

The second feedback circuit may include a third inverter configured to invert the second output signal, a fourth inverter configured to invert a third output signal of the third inverter and to output the inverted signal as the clamping signal, and a second feedback transistor configured to bias the clamping signal to the third inverter. The third inverter may include a third PMOS transistor having the source coupled to the drain of the second feedback transistor, the gate coupled to the third node, the body coupled to the power supply voltage, and the drain coupled to a fourth node. The third inverter may further include a third NMOS transistor having the source coupled to the ground voltage, the gate coupled to the third node, the body coupled to the ground voltage, and the drain coupled to the fourth node. The fourth inverter may include a fourth PMOS transistor having the source coupled to the power supply voltage, the gate coupled to the fourth node, the body coupled to the power supply voltage, and the drain coupled to a fifth node. The fourth inverter may further include a fourth NMOS transistor having the source coupled to the ground voltage, the gate coupled to the fourth node, the body coupled to the ground voltage, and the drain coupled to the fifth node. The second feedback transistor may be a PMOS transistor having the source coupled to the power supply voltage, the gate coupled to the fifth node, the body coupled to the power supply voltage, and the drain coupled to the source of the third PMOS transistor.

The clamp device may include a clamp NMOS transistor having the source coupled to the ground voltage, the gate to which the clamping signal is applied, the body coupled to the ground voltage, and the drain coupled to the power supply voltage. The clamp device may be configured to operate as a forward diode to discharge the first charges to the ground voltage when the negative ESD event or the negative EOS event occurs.

According to example embodiments, a hybrid protection circuit may include a capacitor, a resistor, a first PMOS transistor, a first NMOS transistor, a second PMOS transistor, a second NMOS transistor, a third PMOS transistor, a third NMOS transistor, a fourth PMOS transistor, a fourth NMOS transistor, a fifth PMOS transistor, a sixth PMOS transistor, and a clamp NMOS transistor.

The capacitor may be coupled between a power supply voltage and a first node. The resistor may be coupled to the first node and a ground voltage.

The first PMOS transistor may have the gate coupled to the first node, the body coupled to the power supply voltage, and the drain coupled to a second node. The first NMOS transistor may have the source coupled to the ground voltage, the gate coupled to the first node, the body coupled to the ground voltage, and the drain coupled to the second node.

The second PMOS transistor may have the source coupled to the power supply voltage, the gate coupled to the second node, the body coupled to the power supply voltage, and the drain coupled to a third node. The second NMOS transistor may have the source coupled to the ground voltage, the gate coupled to the second node, the body coupled to the ground voltage, and the drain coupled to the third node.

The third PMOS transistor may have the gate coupled to the third node, the body coupled to the power supply voltage, and the drain coupled to a fourth node. The third NMOS transistor may have the source coupled to the ground voltage, the gate coupled to the third node, the body coupled to the ground voltage, and the drain coupled to the fourth node.

The fourth PMOS transistor may have the source coupled to the power supply voltage, the gate coupled to the fourth node, the body coupled to the power supply voltage, and the drain coupled to a fifth node. The fourth NMOS transistor may have the source coupled to the ground voltage, the gate coupled to the fourth node, the body coupled to the ground voltage, and the drain coupled to the fifth node.

The fifth PMOS transistor may have the source coupled to the power supply voltage, the gate coupled to the third node, the body coupled to the power supply voltage, and the drain coupled to the source of the first PMOS transistor. The sixth PMOS transistor may have the source coupled to the power supply voltage, the gate coupled to the fifth node, the body coupled to the power supply voltage, and the drain coupled to the source of the third PMOS transistor.

The clamp NMOS transistor may have the source coupled to the ground voltage, the gate coupled to the fifth node, and the drain coupled to the power supply voltage.

The capacitor may be a MOS capacitor having the gate coupled to the resistor and the source, the drain, and the body coupled to the power supply voltage. The resistor may include a plurality of serially-connected NMOS transistors each having the gate coupled to the power supply voltage and the body coupled to the ground voltage. A time period of the first node being in a logic "high" state may be determined by the capacitor and the resistor when a positive ESD event or a positive EOS event occurs.

The fifth PMOS transistor and the sixth PMOS transistor may be configured to maintain the fifth node in a logic "high" state until charges generated by the positive ESD event or the positive EOS event are discharged through a channel formed in the clamp NMOS transistor. The clamp device may be configured to operate as a forward diode to discharge charges generated by a negative ESD event or a negative EOS event to the ground voltage.

BRIEF DESCRIPTION OF THE DRAWINGS

Example embodiments will be more clearly understood from the following detailed description taken in conjunction with the accompanying drawings. FIGS. 1-10C represent non-limiting, example embodiments as described herein.

FIG. 1 is a circuit diagram illustrating a conventional gate-grounded NMOS (GGNMOS) transistor.

FIG. 2 is a circuit diagram illustrating a conventional gate-coupled NMOS (GCNMOS) transistor.

FIG. 3 is a block diagram illustrating a hybrid protection circuit according to example embodiments.

FIG. 4 is a circuit diagram illustrating the hybrid protection circuit of FIG. 3 according to an example embodiment.

FIG. 5 is a circuit diagram illustrating the stress detection circuit illustrated in FIG. 4 according to an example embodiment.

FIG. 10C is a simulation diagram illustrating a current through a clamp NMOS transistor constituting a clamp device in which current is applied to a VDD pad according to an example embodiment.

DESCRIPTION OF EXAMPLE EMBODIMENTS

Figure 1:
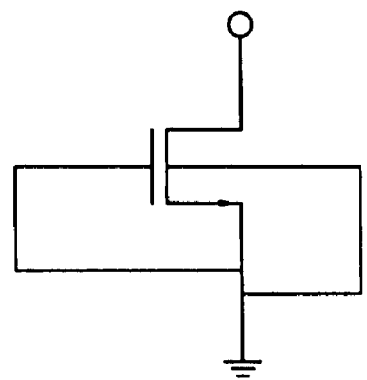
Figure 2:
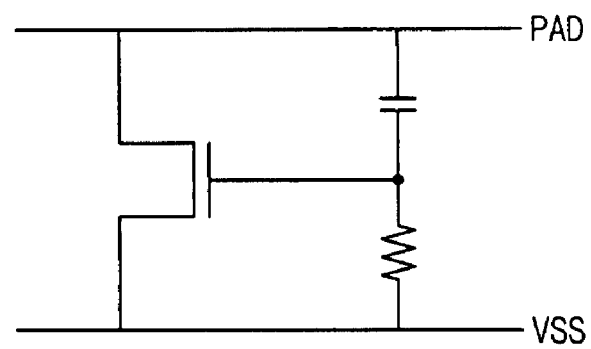

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
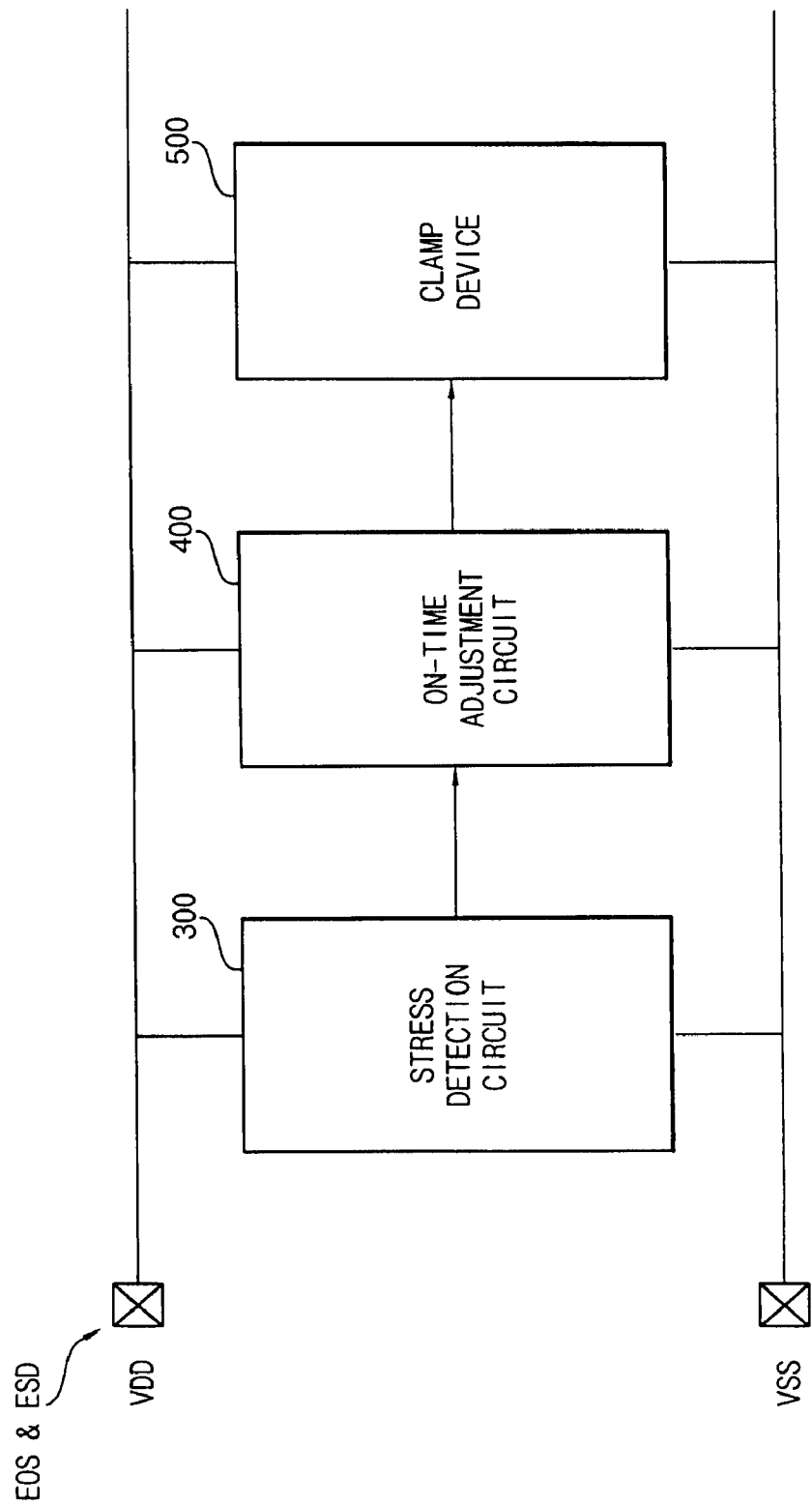

FIG. 3 is a block diagram illustrating a hybrid protection circuit according to example embodiments.

Referring to FIG. 3, the hybrid protection circuit may include a stress detection circuit 300, an on-time adjustment circuit 400, and a clamp device 500.

The stress detection circuit 300, the on-time adjustment circuit 400, and the clamp device 500 may be connected between a power supply voltage VDD and a ground voltage VSS to more efficiently protect the internal core from an ESD event and an EOS event.

Figure 4:
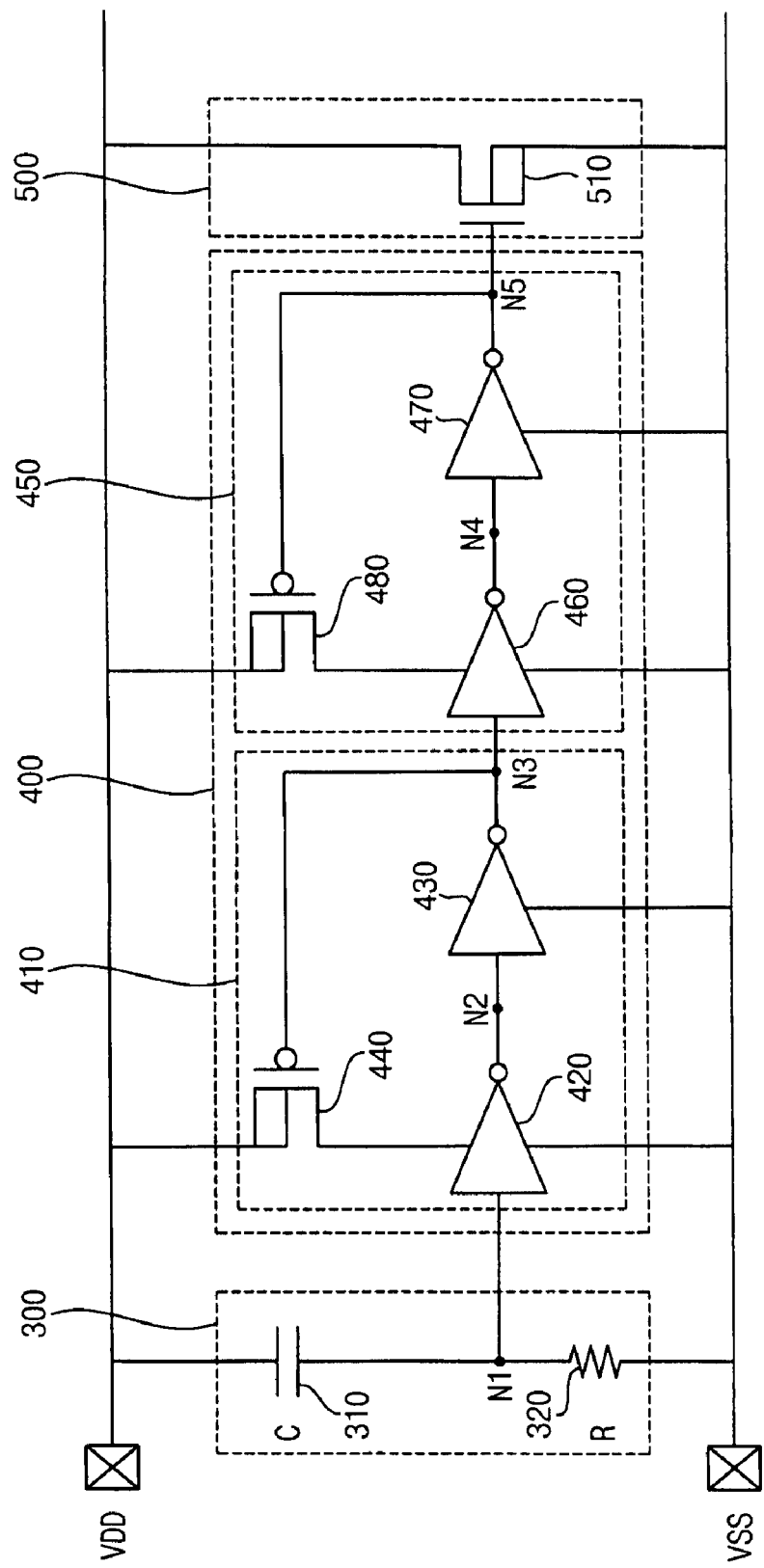

FIG. 4 is a circuit diagram illustrating the hybrid protection circuit of FIG. 3 according to an example embodiment.

Referring to FIG. 4, the stress detection circuit 300 may include a capacitor 310 and a resistor 320 that are connected in series.

The on-time adjustment circuit 400 may include a first feedback circuit 410 and a second feedback circuit 450. The first feedback circuit 410 may include a first inverter 420, a second inverter 430, and a first feedback transistor 440. The second feedback circuit 450 may include a third inverter 460, a fourth inverter 470, and a second feedback transistor 480.

Figure 5:
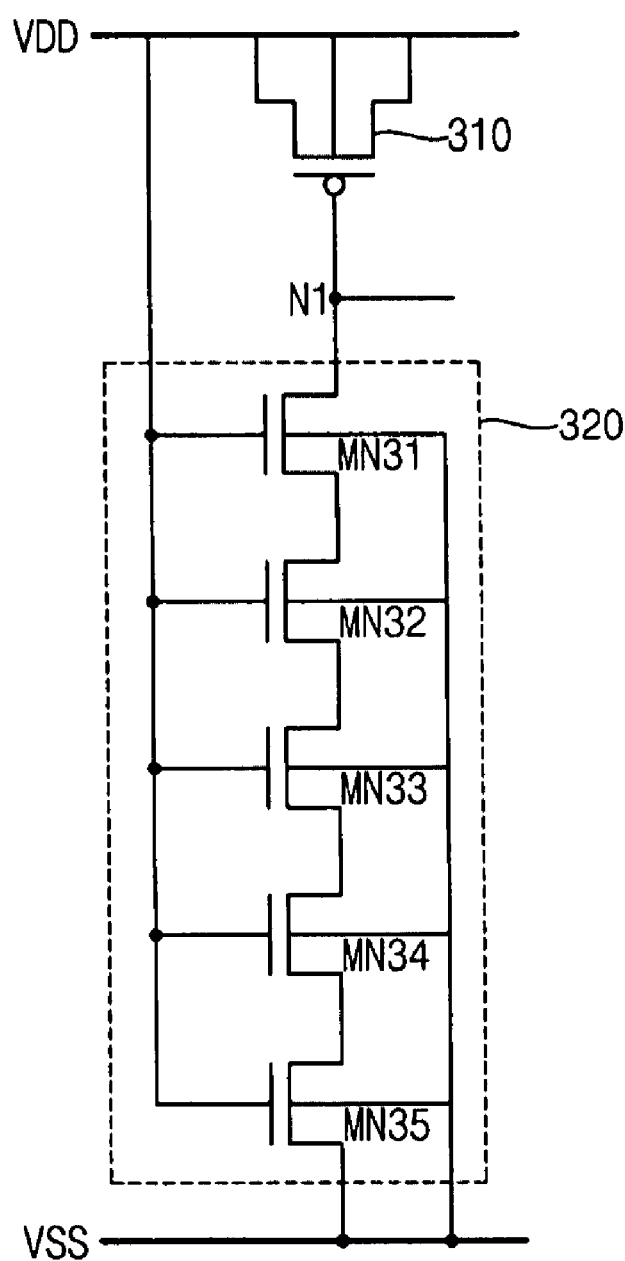

FIG. 5 is a circuit diagram illustrating the stress detection circuit illustrated in FIG. 4 according to an example embodiment.

Referring to FIG. 5, the capacitor 310 may be implemented with a PMOS transistor in which the gate is coupled to the resistor 320 and the source, the drain, and the body are coupled to the power supply voltage VDD. The capacitor 310 may be implemented as other types of capacitors. The resistor 320 may include five NMOS transistors MN31 through MN35 that are connected in series. The bodies of the NMOS transistors MN31 through MN35 may be coupled to the ground voltage VSS and the gates of the NMOS transistors MN31 through MN35 may be coupled to the power supply voltage VDD. The resistor 310 may be implemented as other types of devices.

Figure 6A:
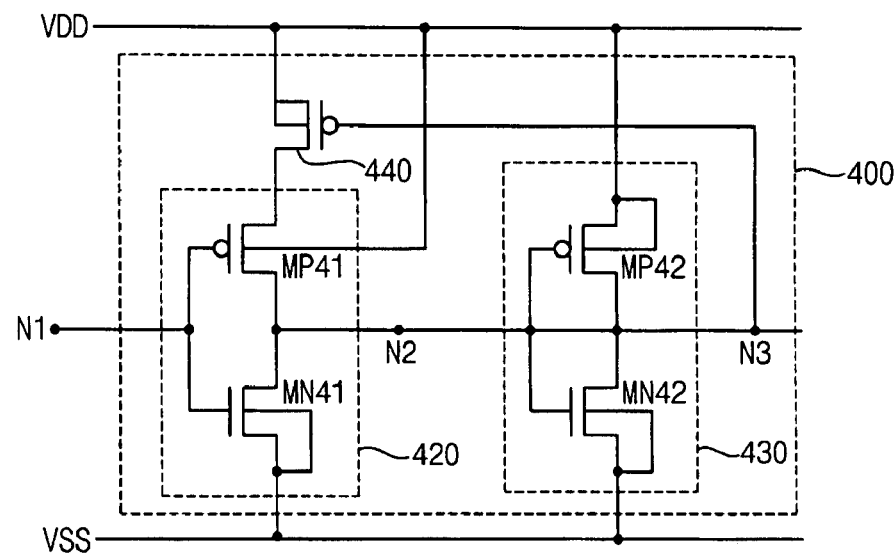
FIG. 6A is a circuit diagram illustrating the first feedback circuit illustrated in FIG. 4 according to an example embodiment.
Figure 6B:
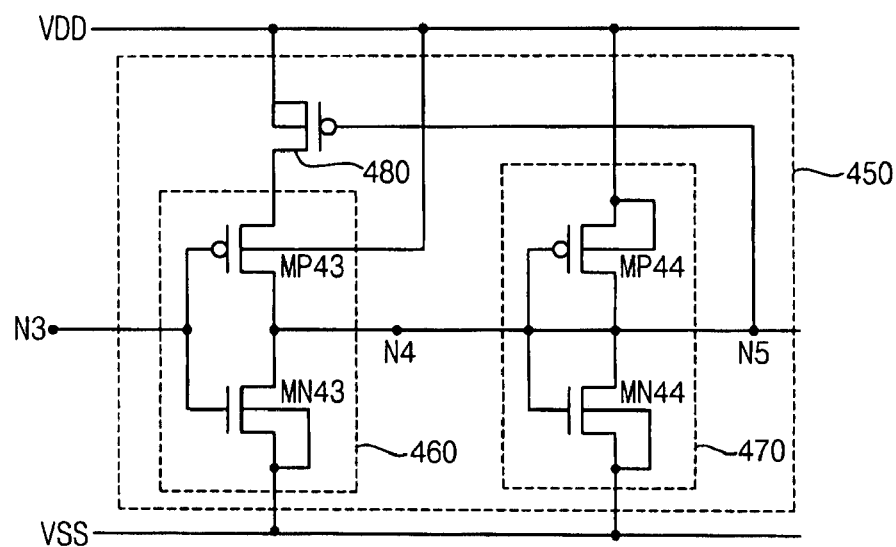
FIG. 6B is a circuit diagram illustrating the second feedback circuit illustrated in FIG. 4 according to an example embodiment.

FIG. 6A is a circuit diagram illustrating the first feedback circuit illustrated in FIG. 4 according to an example embodiment. FIG. 6B is a circuit diagram illustrating the second feedback circuit illustrated in FIG. 4 according to an example embodiment.

Referring to FIG. 6A, the first feedback circuit 410 may include the first inverter 420 having a first PMOS transistor MP41 and a first NMOS transistor MN41, the second inverter 430 having a second PMOS transistor MP42 and a second NMOS transistor MN42, and the first feedback transistor 440.

The gate of the first PMOS transistor MP41 may be coupled to a first node N1, the drain of the first PMOS transistor MP41 may be coupled to a second node N2, and the body of the first PMOS transistor MP41 may be coupled to the power supply voltage VDD. The gate of the first NMOS transistor MN41 may be coupled to the first node N1, the drain of the first NMOS transistor MN41 may be coupled to the second node N2, and the source and the body of the first NMOS transistor MN41 may be coupled to the ground voltage VSS. The gate of the second PMOS transistor MP42 may be coupled to the second node N2, the drain of the second PMOS transistor MP42 may be coupled to a third node N3, and the source and the body of the second PMOS transistor MP42 may be coupled to the power supply voltage VDD. The gate of the second NMOS transistor MN42 may be coupled to the second node N2, the drain of the second NMOS transistor MN42 may be coupled to the third node N3, and the source and the body of the second NMOS transistor MN42 may be coupled to the ground voltage VSS. The first feedback transistor 440 may be implemented as a PMOS transistor in which the gate may be coupled to the third node N3, the drain may be coupled to the source of the first PMOS transistor MP41, and the source and the body may be coupled to the power supply voltage VDD.

Referring to FIG. 6B, the second feedback circuit 450 may include the third inverter 460 having a third PMOS transistor MP43 and a third NMOS transistor MN43, the fourth inverter 470 having a fourth PMOS transistor MP44 and a fourth NMOS transistor MN44, and the second feedback transistor 480.

The gate of the third PMOS transistor MP43 may be coupled to the third node N3, the drain of the third PMOS transistor MP43 may be coupled to a fourth node N4, and the body of the third PMOS transistor MP43 may be coupled to the power supply voltage VDD. The gate of the third NMOS transistor MN43 may be coupled to the third node N3, the drain of the third NMOS transistor MN43 may be coupled to the fourth node N4, and the source and the body of the third NMOS transistor MN43 may be coupled to the ground voltage VSS. The gate of the fourth PMOS transistor MP44 may be coupled to the fourth node N4, the drain of the fourth PMOS transistor MP44 may be coupled to a fifth node N5, and the source and the body of the fourth PMOS transistor MP44 may be coupled to the power supply voltage VDD. The gate of the fourth NMOS transistor MN44 may be coupled to the fourth node N4, the drain of the fourth NMOS transistor MN44 may be coupled to the fifth node N5, and the source and the body of the fourth NMOS transistor MN44 may be coupled to the ground voltage VSS. The second feedback transistor 480 may be implemented as a PMOS transistor in which the gate may be coupled to the fifth node N5, the drain may be coupled to the source of the third PMOS transistor MP43, and the source and the body may be coupled to the power supply voltage VDD.

Referring back to FIG. 4, the clamp device 500 may be implemented as a clamp NMOS transistor 510 in which the gate may be coupled to the fifth node N5, the drain may be coupled to the power supply voltage VDD, and the source and the body may be coupled to the ground voltage VSS.

Hereinafter, operations of the hybrid protection circuit according to example embodiments will be described with reference to FIGS. 3 through 6B.

In FIG. 3, when negative ESD stress or negative EOS stress is applied to a pad of the power supply voltage VDD, charges generated by a negative ESD event or a negative EOS event may be discharged to the ground voltage VSS by the clamp NMOS transistor 510 operating as a diode. However, when a positive ESD event or a positive EOS event occurs, complex operations may be required. Hereinafter, operations of the hybrid protection circuit when a positive ESD event or a positive EOS event occurs according to example embodiments will be described below.

In FIG. 4, when a positive ESD event occurs, positive charges injected into the pad of the power supply voltage VDD may charge the capacitor 310, and thus, the level of the first node N1 may become a logic "high". The voltage of the first node N1 may be a detection signal or an output signal of the stress detection circuit 300. The level of the second node N2 may become a logic "low" via the first through fourth inverters 420, 430, 460, and 470. In addition, the level of the third node N3 may become a logic "high", the level of the fourth node N4 may become a logic "low", and the level of the fifth node N5 may become a logic "high". If the level of the fifth node N5 becomes a logic "high", then the positive charges generated by the positive ESD event may be discharged through the channel formed in the clamp NMOS transistor 510, and thus, the internal core may be protected from the positive ESD event.

The duration of the pulse widths of a positive EOS event may be different from the duration of the pulse widths of a positive ESD event. The duration of the pulse widths of a positive EOS event may be longer than the duration of the pulse widths of a positive ESD event. The duration of the pulse widths of a positive ESD event may be about 1 μs. However, the duration of the pulse widths of a positive EOS event may be about 50 μs. Therefore, the on-time of the clamp device 500 should be extended to sufficiently discharge charges that may be generated by the positive EOS event.

To extend the on-time, the on-time adjustment circuit 400 may include the first feedback circuit 410 and the second feedback circuit 450.

When charges generated by a positive EOS event are injected into the pad of the power supply voltage VDD, the first node N1 may maintain a logic "high" level during a RC rise time. After the RC rise time, even if the state of the first node N1 changes from a logic "high" to a logic "low", the state of the second node N2 may not immediately change to a logic "high" by the first feedback transistor 440. An on-time delay may be generated for as long as the charging time of the parasitic capacitor of the second inverter 430 (which is charged by sub-threshold leakage of the first feedback transistor 440) or for as long as the time required for the second node N2 (of which voltage may be an output of the first inverter 420) to change to a logic "high" level. Similarly, another on-time delay may be generated at the second feedback circuit 450. Therefore, the clamp NMOS transistor 510 included in the clamp device 500 may be turned on during a predetermined or given time.

The RC rise time of the capacitor 310 and the resistor 320 included in the stress detection circuit 300 may be longer than the rise time of an EOS stress that is about 1.2 μs to detect the pulse of an EOS event.

The first feedback circuit 410 and the second feedback circuit 420 that may be serially connected may extend the on-time. The on-time may be extended to about 10 μs by the first feedback circuit 410. The on-time may then be extended again by the second feedback circuit 450. Therefore, the clamp NMOS transistor 510 included in the clamp device 500 may be turned on while the charges that are generated by the EOS event are sufficiently discharged.

Figure 7A:
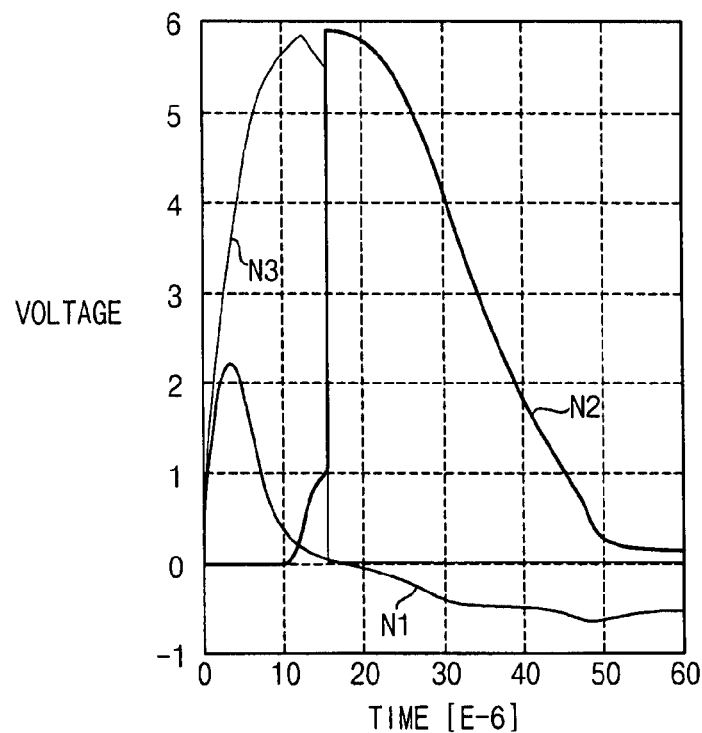
FIG. 7A is a simulation diagram illustrating EOS characteristics at several nodes of the first feedback circuit according to an example embodiment.
Figure 7B:
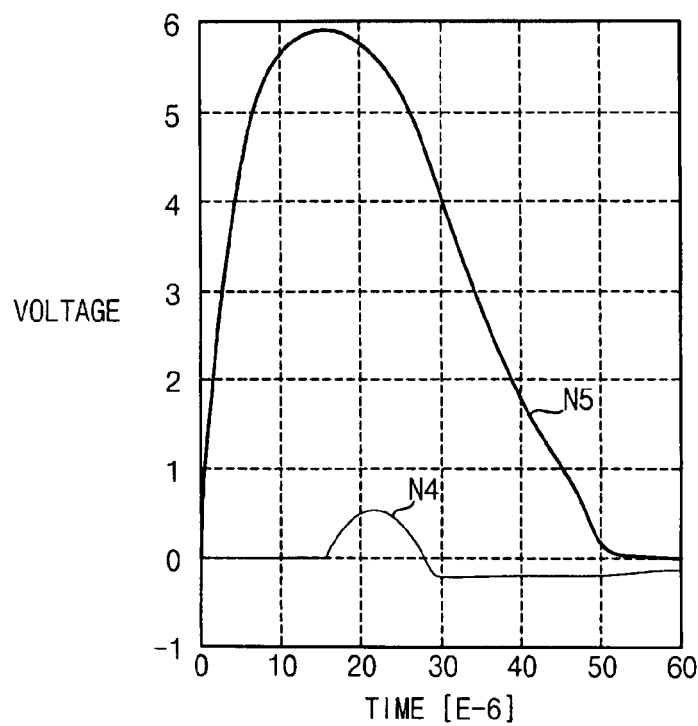
FIG. 7B is a simulation diagram illustrating EOS characteristics at several nodes of the second feedback circuit according to an example embodiment.

FIG. 7A is a simulation diagram illustrating EOS characteristics at several nodes of the first feedback circuit according to an example embodiment. FIG. 7B is a simulation diagram illustrating EOS characteristics at several nodes of the second feedback circuit according to an example embodiment.

Referring to FIG. 7A, the state of the first node N1 of FIG. 4 may change from a logic "high" to a logic "low". However, the state of the second node N2 of FIG. 4 may not immediately change from a logic "low" to a logic "high" but rather after the on-time delay by the first feedback transistor 440.

Referring to FIG. 7B, the transition time of the voltage of the fifth node N5 of FIG. 4 may be longer than the transition time of the voltage of the fourth node N4 of FIG. 4 due to the second feedback transistor 480 of FIG. 4. The state of the first node N1 may change from a logic "high" to a logic "low" within about 10 µs. However the state of the fifth node N5 may change from a logic "high" to a logic "low" by the on-time adjustment circuit 400 within about 50 µs. Therefore, a hybrid protection circuit according to example embodiments may efficiently protect the internal core by sufficiently discharging charges generated by an EOS event.

Figure 8A:
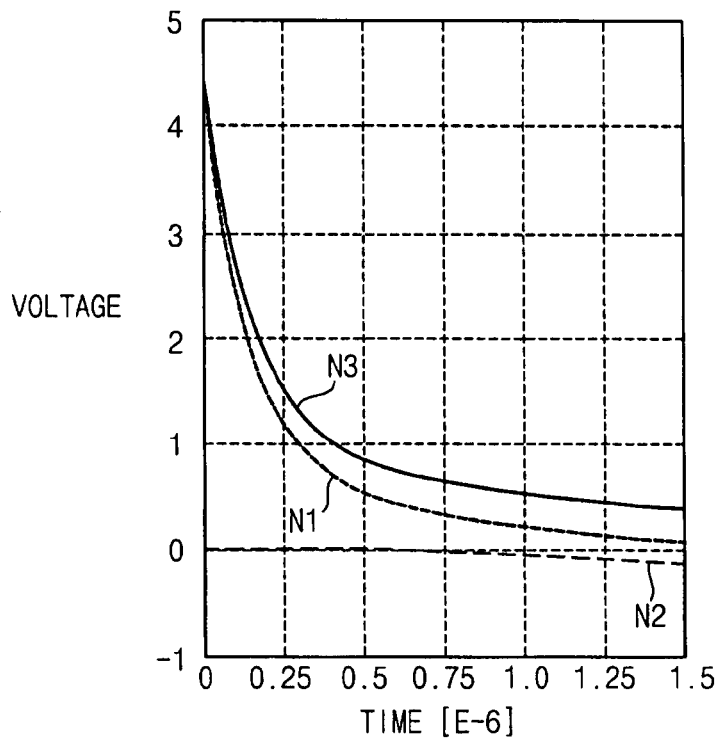
FIG. 8A and FIG. 8B are simulation diagrams illustrating human body model (HBM) characteristics of the first feedback circuit and the second feedback circuit according to an example embodiment.
Figure 8B:
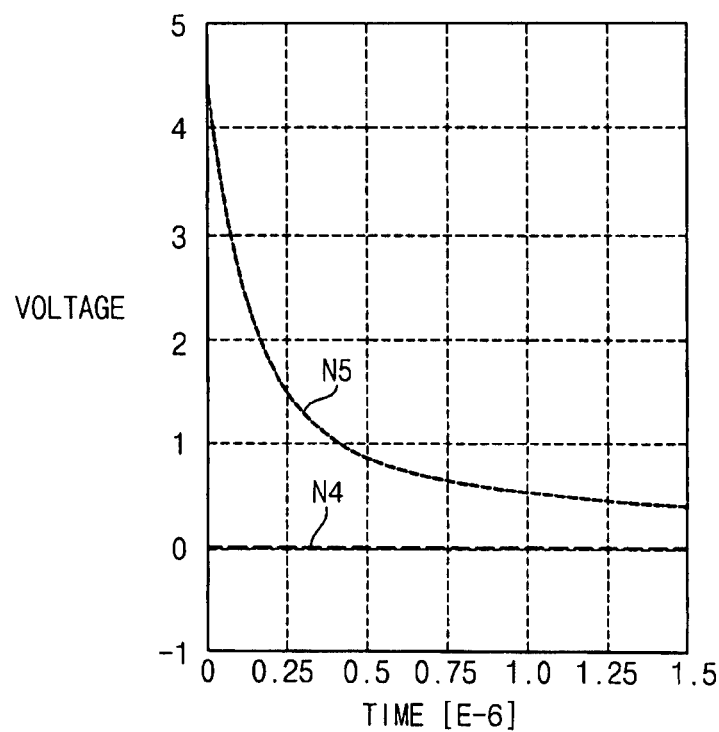

FIG. 8A and FIG. 8B are simulation diagrams illustrating human body model (HBM) characteristics of the first feedback circuit and the second feedback circuit according to an example embodiment.

Referring to FIG. 8A and FIG. 8B, the transition time of the voltage of the fifth node N5 may be longer than the transition time of the voltage of the first node N1. Therefore, charges may be discharged through the clamp device 500 within the duration of ESD HBM events.

Figure 9A:
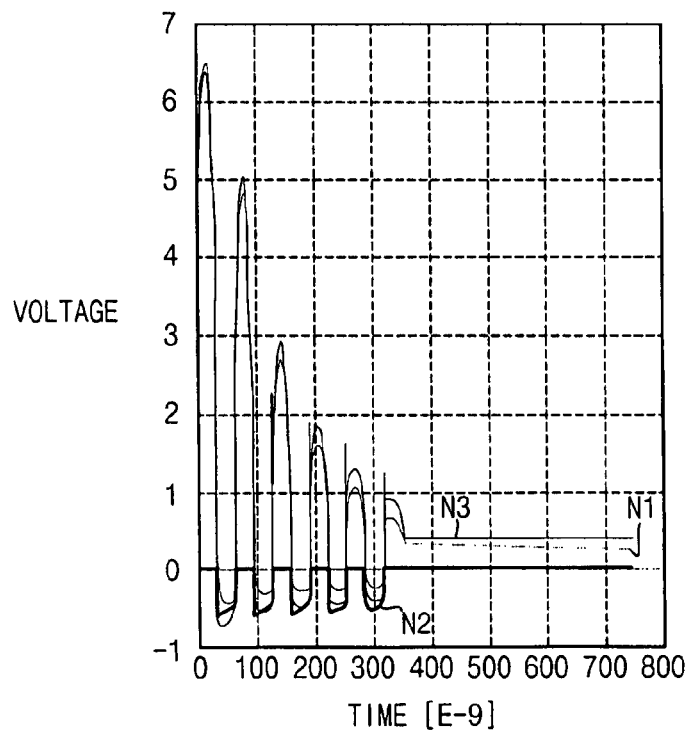
FIG. 9A and FIG. 9B are simulation diagrams illustrating machine model (MM) characteristics of the first feedback circuit and the second feedback circuit according to an example embodiment.
Figure 9B:
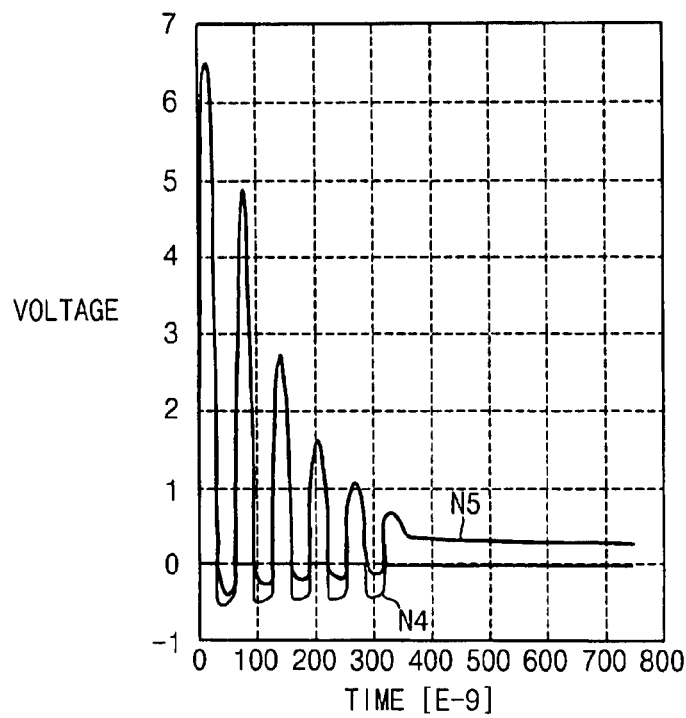

FIG. 9A and FIG. 9B are simulation diagrams illustrating machine model (MM) characteristics of the first feedback circuit and the second feedback circuit according to an example embodiment.

Referring to FIG. 9A and FIG. 9B, the fifth node N5 may transition from a logic "high" to a logic "low" while the first node N1 may transition from a logic "high" to a logic "low". Therefore, charges may be discharged through the clamp device 500 within the duration of ESD MM events.

Figure 10A:
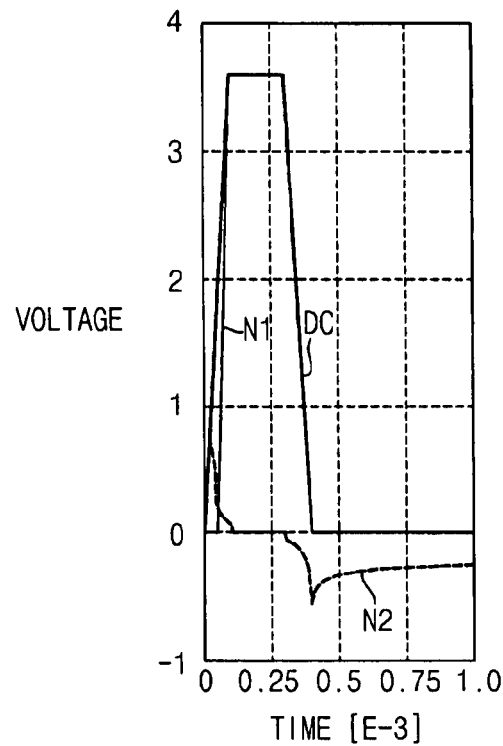
FIG. 10A and FIG. 10B are simulation diagrams illustrating DC characteristics of the first feedback circuit and the second feedback circuit according to an example embodiment.
Figure 10B:
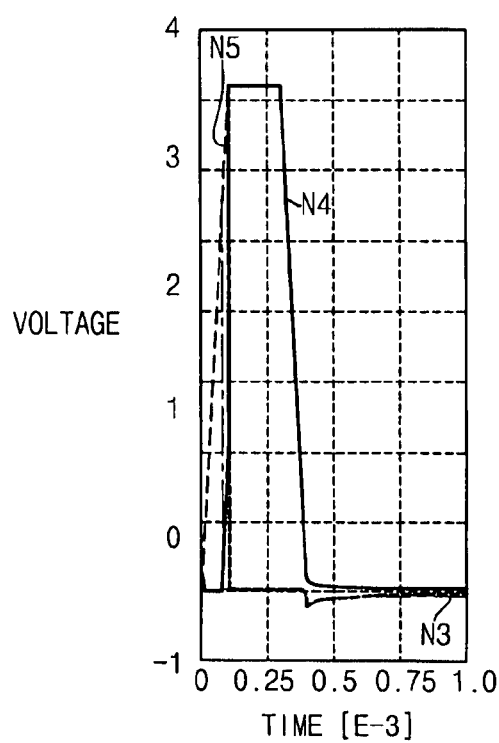

FIG. 10A and FIG. 10B are simulation diagrams illustrating DC characteristics of the first feedback circuit and the second feedback circuit according to an example embodiment.

Figure 10C:
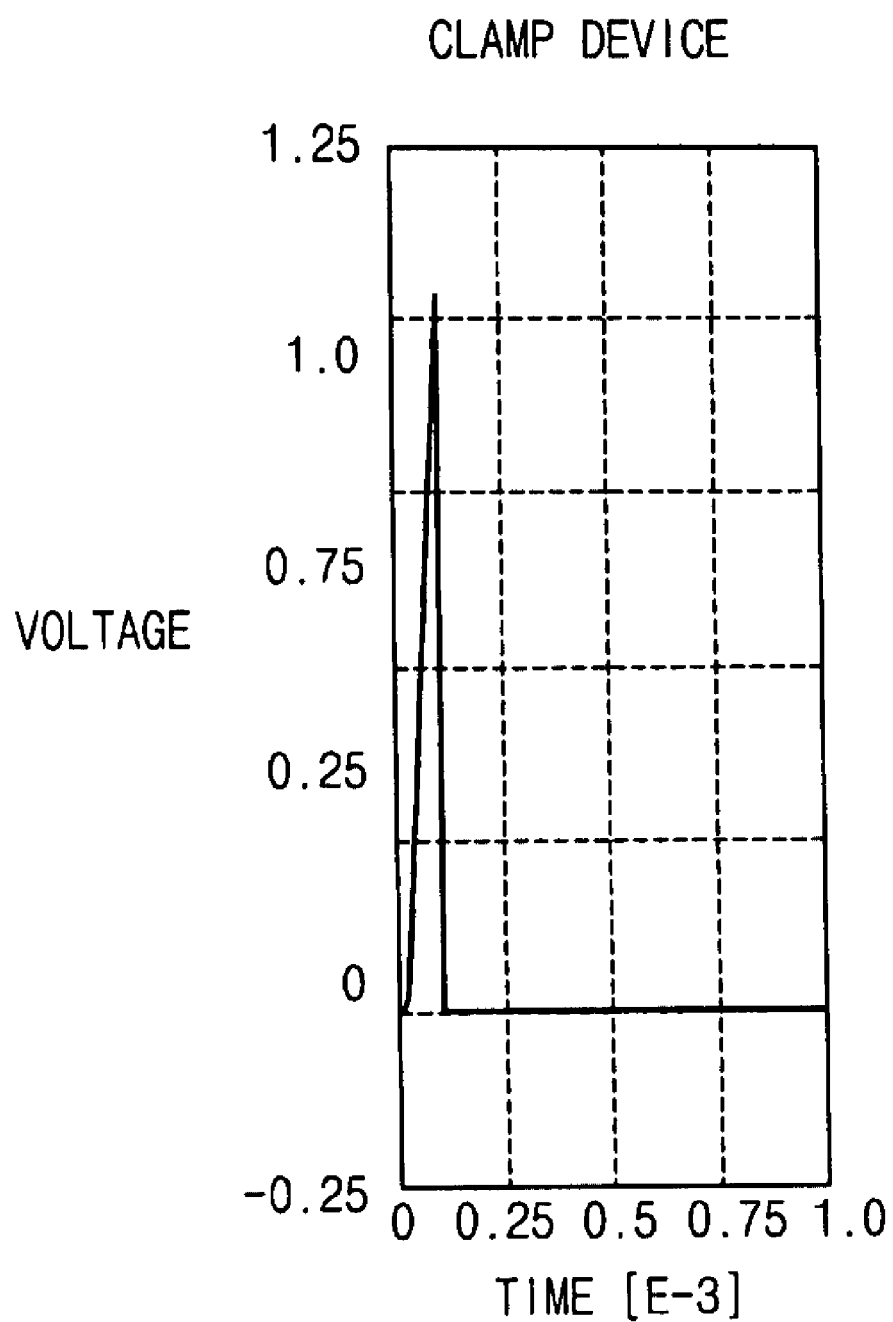

FIG. 10C is a simulation diagram illustrating a current through a clamp NMOS transistor constituting a clamp device when current is applied to a VDD pad according to an example embodiment.

As mentioned above, the hybrid protection circuit according to example embodiments may efficiently protect the internal core of a device by sufficiently discharging charges generated by an ESD event and/or an EOS event. In addition, the hybrid protection circuit according to example embodiments may adjust the on-time to more efficiently protect the internal core from an ESD event and/or an EOS event.

The foregoing is illustrative of example embodiments and is not to be construed as limiting thereof. Although example embodiments have been described, those skilled in the art will readily appreciate that many modifications are possible in example embodiments without materially departing from the novel teachings and advantages of example embodiments. Accordingly, all such modifications are intended to be included within the scope of the claims. Therefore, it is to be understood that the foregoing is illustrative of example embodiments and is not to be construed as limited to the specific embodiments disclosed, and that modifications to the disclosed embodiments, as well as other embodiments, are intended to be included within the scope of the appended claims. Example embodiments are defined by the following claims, with equivalents of the claims to be included therein.

What is claimed is:

1. A hybrid protection circuit, comprising:
a stress detection circuit between a power supply voltage and a ground voltage, the stress detection circuit configured to output a detection signal that is activated when a positive electrostatic discharge (ESD) event or a positive electrical over-stress (EOS) event occurs;
a clamp device between the power supply voltage and the ground voltage, the clamp device configured to discharge first charges generated by a negative ESD event or a negative EOS event when the negative ESD event or the negative EOS event occurs and configured to discharge second charges generated by the positive ESD event or the positive EOS event in response to a clamping signal activated when the positive ESD event or the positive EOS event occurs; and
an on-time adjustment circuit between the power supply voltage and the ground voltage, the on-time adjustment circuit configured to receive the detection signal, configured to output the clamping signal, and configured to maintain the clamping signal in an active state until the second charges generated by the positive ESD event or the positive EOS event are discharged, wherein
the on-time adjustment circuit includes a first feedback circuit and a second feedback circuit connected in series with respect to each other,
an output of the second feedback circuit is connected to a control input of the clamp device,
the first feedback circuit includes:
a first inverter configured to invert the detection signal;
a second inverter configured to invert a first output signal of the first inverter; and
a first feedback transistor configured to bias a second output signal of the second inverter to the first inverter, and
the second feedback circuit includes:
a third inverter configured to invert the second output signal;
a fourth inverter configured to invert a third output signal of the third inverter to generate the output of the second feedback circuit, as the clamping signal; and
a second feedback transistor configured to bias the clamping signal to the third inverter.

2. The hybrid protection circuit of claim 1, wherein the stress detection circuit comprises:
a capacitor coupled between the power supply voltage and a first node; and
a resistor coupled between the first node and the ground voltage.

3. The hybrid protection circuit of claim 2, wherein the capacitor is a MOS capacitor having a gate coupled to the resistor and having a source, a drain, and a body coupled to the power supply voltage.

4. The hybrid protection circuit of claim 2, wherein the resistor includes a plurality of serially-connected NMOS transistors each having a gate coupled to the power supply voltage and a body coupled to the ground voltage.

5. The hybrid protection circuit of claim 2, wherein a time period of the detection signal being in an active state is determined by a capacitance of the capacitor and a resistance of the resistor.

6. The hybrid protection circuit of claim 1, wherein each of the first feedback circuit and the second feedback circuit have a feedback architecture that adjusts an on-time of the clamping signal.

7. The hybrid protection circuit of claim 6, wherein the first inverter comprises:
a first PMOS transistor having a source coupled to a drain of the first feedback transistor, a gate coupled to a first node, a body coupled to the power supply voltage, and a drain coupled to a second node; and a first NMOS transistor having a source coupled to the ground voltage, a gate coupled to the first node, a body coupled to the ground voltage, and a drain coupled to the second node.

8. The hybrid protection circuit of claim 7, wherein the second inverter comprises:

a second PMOS transistor having a source coupled to the power supply voltage, a gate coupled to the second node, a body coupled to the power supply voltage, and a drain coupled to a third node; and a second NMOS transistor having a source coupled to the ground voltage, a gate coupled to the second node, a body coupled to the ground voltage, and a drain coupled to the third node.

9. The hybrid protection circuit of claim 8, wherein the first feedback transistor is a PMOS transistor having a source coupled to the power supply voltage, a gate coupled to the third node, a body coupled to the power supply voltage, and a drain coupled to the source of the first PMOS transistor.

10. The hybrid protection circuit of claim 9, wherein the third inverter comprises:

a third PMOS transistor having a source coupled to a drain of the second feedback transistor, a gate coupled to the third node, a body coupled to the power supply voltage, and a drain coupled to a fourth node; and a third NMOS transistor having a source coupled to the ground voltage, a gate coupled to the third node, a body coupled to the ground voltage, and a drain coupled to the fourth node.

11. The hybrid protection circuit of claim 10, wherein the fourth inverter comprises:

a fourth PMOS transistor having a source coupled to the power supply voltage, a gate coupled to the fourth node, a body coupled to the power supply voltage, and a drain coupled to a fifth node; and a fourth NMOS transistor having a source coupled to the ground voltage, a gate coupled to the fourth node, a body coupled to the ground voltage, and a drain coupled to the fifth node.

12. The hybrid protection circuit of claim 11, wherein the second feedback transistor is a PMOS transistor having a source coupled to the power supply voltage, a gate coupled to the fifth node, a body coupled to the power supply voltage, and a drain coupled to the source of the third PMOS transistor.

13. The hybrid protection circuit of claim 1, wherein the clamp device includes a clamp NMOS transistor having a source coupled to the ground voltage, the control input to which the output of the second feedback circuit is applied as the clamping signal, a body coupled to the ground voltage, and a drain coupled to the power supply voltage.

14. The hybrid protection circuit of claim 13, wherein the clamp device is configured to operate as a forward diode to discharge the first charges to the ground voltage when the negative ESD event or the negative EOS event occurs.

15. A hybrid protection circuit, comprising:

a capacitor coupled between a power supply voltage and a first node;

a resistor coupled between the first node and a ground voltage;

a first PMOS transistor having a gate coupled to the first node, a body coupled to the power supply voltage, and a drain coupled to a second node;

a first NMOS transistor having a source coupled to the ground voltage, a gate coupled to the first node, a body coupled to the ground voltage, and a drain coupled to the second node;

a second PMOS transistor having a source coupled to the power supply voltage, a gate coupled to the second node, a body coupled to the power supply voltage, and a drain coupled to a third node;

a second NMOS transistor having a source coupled to the ground voltage, a gate coupled to the second node, a body coupled to the ground voltage, and a drain coupled to the third node;

a third PMOS transistor having a gate coupled to the third node, a body coupled to the power supply voltage, and a drain coupled to a fourth node;

a third NMOS transistor having a source coupled to the ground voltage, a gate coupled to the third node, a body coupled to the ground voltage, and a drain coupled to the fourth node;

a fourth PMOS transistor having a source coupled to the power supply voltage, a gate coupled to the fourth node, a body coupled to the power supply voltage, and a drain coupled to a fifth node;

a fourth NMOS transistor having a source coupled to the ground voltage, a gate coupled to the fourth node, a body coupled to the ground voltage, and a drain coupled to the fifth node;

a fifth PMOS transistor having a source coupled to the power supply voltage, a gate coupled to the third node, a body coupled to the power supply voltage, and a drain coupled to a source of the first PMOS transistor;

a sixth PMOS transistor having a source coupled to the power supply voltage, a gate coupled to the fifth node, a body coupled to the power supply voltage, and a drain coupled to a source of the third PMOS transistor; and a clamp NMOS transistor having a source coupled to the ground voltage, a gate coupled to the fifth node, and a drain coupled to the power supply voltage.

16. The hybrid protection circuit of claim 15, wherein the capacitor is a MOS capacitor having a gate coupled to the resistor and having a source, a drain, and a body coupled to the power supply voltage.

17. The hybrid protection circuit of claim 15, wherein the resistor includes a plurality of serially-connected NMOS transistors each having a gate coupled to the power supply voltage and a body coupled to the ground voltage.

18. The hybrid protection circuit of claim 15, wherein a time period of the first node being in a logic "high" state is determined by the capacitor and the resistor when a positive ESD event or a positive EOS event occurs.

19. The hybrid protection circuit of claim 18, wherein the fifth PMOS transistor and the sixth PMOS transistor are configured to maintain the fifth node in a logic "high" state until charges generated by the positive ESD event or the positive EOS event are discharged through a channel formed in the clamp NMOS transistor.

20. The hybrid protection circuit of claim 15, wherein the clamp device is configured to operate as a forward diode to discharge charges generated by a negative ESD event or a negative EOS event to the ground voltage.

* * * * *